Figure 1:
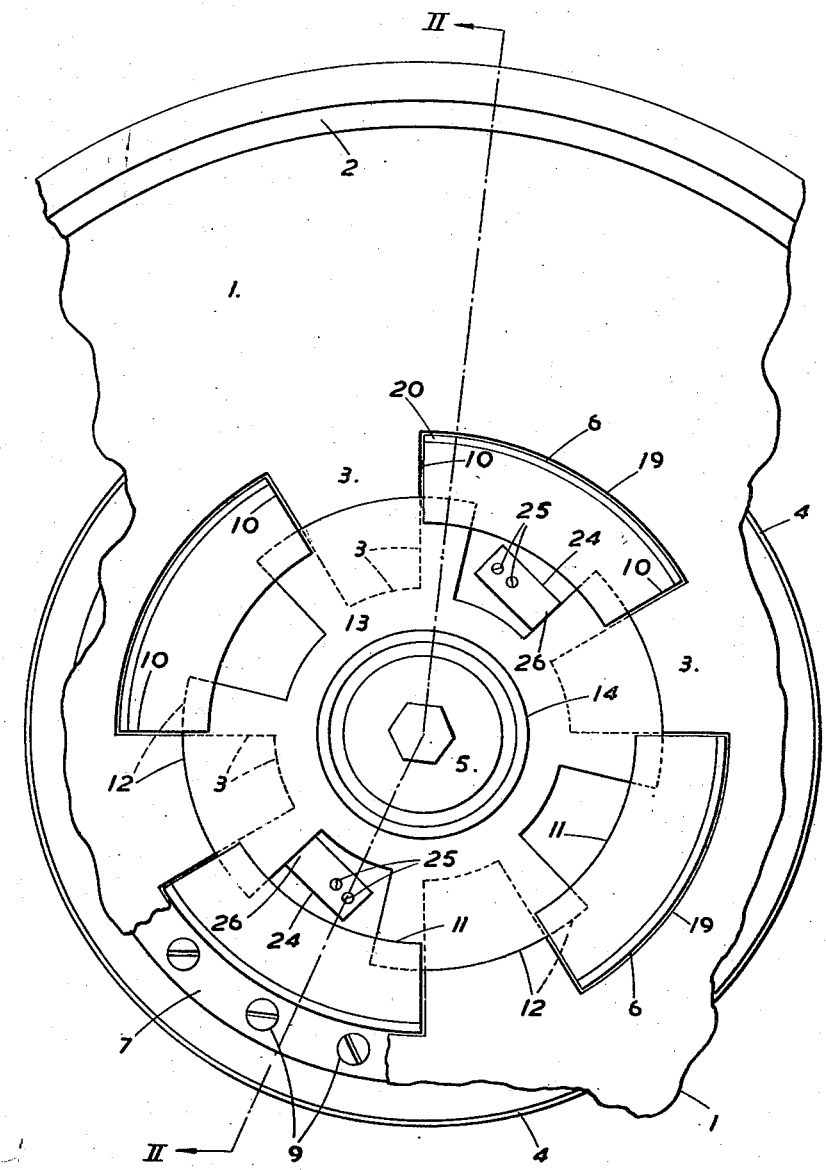

Oct. 30, 1951  W. R. WHITEHEAD  2,573,079
DETACHABLE VEHICLE WHEEL
Filed Aug. 5, 1948  3 Sheets-Sheet 2

Inventor Walter Roy Whitehead
By his Attorney

Patented Oct. 30, 1951

2,573,079

UNITED STATES PATENT OFFICE 2,573,079

DETACHABLE VEHICLE WHEEL

Walter Roy Whitehead, Gillingham, England

Application August 5, 1948, Serial No. 42,721
In Great Britain August 11, 1947

8 Claims. (Cl. 301—9)

This invention relates to detachable vehicle wheels, with more particular reference to means for attaching pneumatic tyred wheels of road vehicles to their respective axles, brake drums, hubs or equivalent rotary mountings.

Customarily such attachment is effected by mounting each wheel on a plurality of studs projecting from the brake drum, locking nuts being thereafter screwed on to the studs. A disadvantage of this method lies in the time and effort required to unscrew and replace with uniform tightness all the locking nuts whenever a wheel change is necessitated.

One object of the present invention is to provide an arrangement enabling the wheel to be secured or detached by a rapid operation, while a further object is to eliminate the necessity of detachable parts such as the conventional locking nuts.

Wheel attaching means according to the invention comprise a conical or inclined lead or leads on the axle, brake drum, hub or equivalent to guide the wheel to a central position on securement, lateral projections from the brake drum or equivalent adapted to engage corresponding apertures in the wheel to transmit torque thereof, and slidable locking means for securing the wheel in position on the brake drum or equivalent preferably by the operation of a single locking member.

Preferably the locking means consists of a rotatable ring having outwardly projecting locking segments, in which case the inner periphery of the wheel is correspondingly interrupted to pass over the locking ring segments during attachment, and such interruptions may conveniently also co-operate with the torque transmitting projections on the brake drum or equivalent.

Where such a locking ring is employed, the wheel centralising lead is preferably of conical shape and it may act upon the interrupted inner peripheral spoke or segment portions of the wheel, or it may be formed on the torque transmitting projections so as to act upon the margins of the corresponding apertures in the wheel.

The locking ring may be permanently retained on the brake drum or equivalent by an annular flange, assembly being effected either by fixing the flange after the ring has been placed in position or by employing a split ring, or it may be retained by inwardly directed lips on the torque transmitting projections.

The leading edges of the locking ring segments, in the direction of locking, may be provided with inclined faces so that the wheel may be more easily engaged and effectively urged into abutment with the brake drum or equivalent on rotation of the ring to the locked position from a release position where it does not obstruct removal of the wheel.

In a preferred embodiment the torque transmitting projections are provided on a brake drum and are furnished with inwardly directed lips adapted to embrace or overlie the locking ring segments and to co-operate therewith in laterally securing the wheel to the brake drum.

The locking ring segments occupy arcs substantially equal to, though not greater than, those occupied by the inwardly directed lips, and both are wider than the intervening gaps which accommodate the wheel segments. It is thus possible for each locking ring segment to bridge an adjoining pair of lips with a wheel segment therebetween and thereby provide a very rigid securement, while when rotated to the release position the segments are completely lapped by such lips so as to leave the gaps unobstructed for the removal of the wheel.

Figure 2:
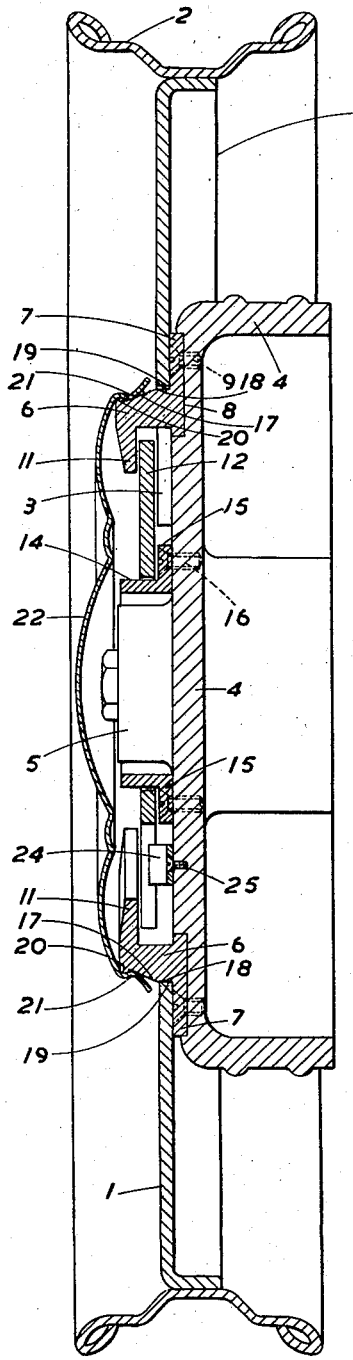
Figure 3:
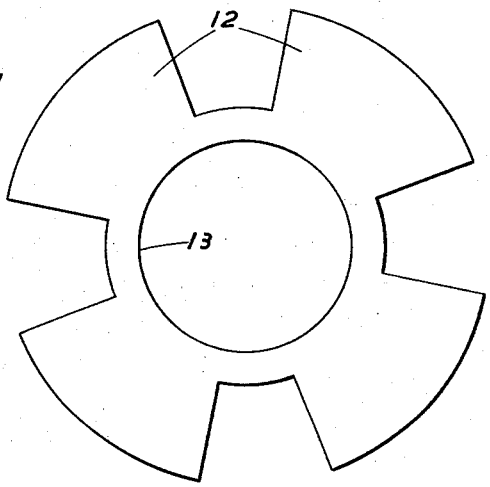
Figure 4:
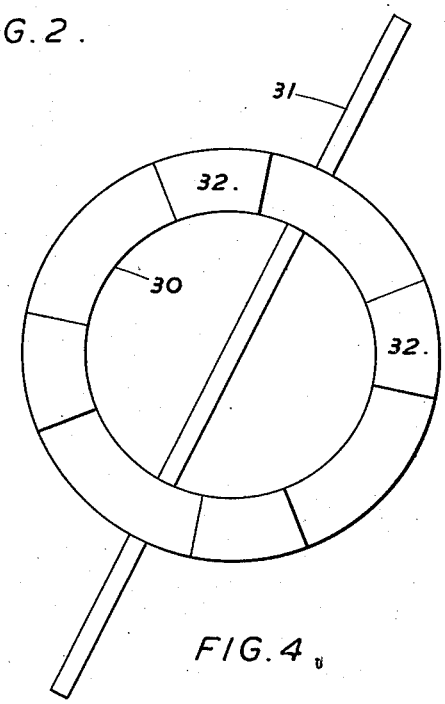
Figure 5:
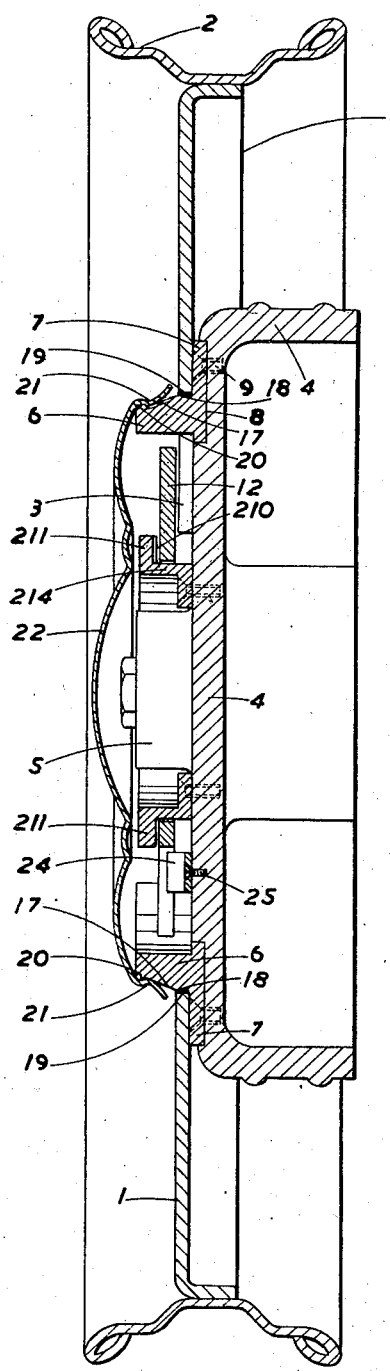

This preferred embodiment of the invention applied to a motor vehicle wheel will be described by way of example with reference to the accompanying drawings in which Fig. 1 is an elevation of the wheel and hub with the hub cap removed and the locking ring in the locked position, Fig. 2 is a section along the line II—II of Fig. 1 and shows the hub cap in position, Fig. 3 shows the locking ring separately in elevation, Fig. 4 shows in plan a tool for actuating the locking ring, and Fig. 5 is a view similar to Fig. 2 showing a modified construction.

Referring now to the drawings and more particularly to Figs. 1–3, a disc wheel comprising a dished metal plate 1 and a rim 2 for a pneumatic tyre is provided with four inwardly directed radial spokes or wheel segments 3 for attachment to a brake drum 4 having a central hub 5.

Four part circular torque transmitting projections 6 are provided on a ring 7 attached to and concentric with the brake drum 4 and recessed in a corresponding groove 8 in the face of the brake drum to which it is secured by means such as screws 9. The projections 6 are furnished at each end with radial torque transmitting faces 10 and have inwardly directed lips 11 adapted to embrace or overlie the outer portions of radial segments 12 of a locking ring or plate 13 and to co-operate therewith in securing the wheel by its segments 3 to the brake drum as hereafter described.

The locking ring 13 is rotatably carried on a bush 14 encircling the hub 5 and flanged at 15 for attachment to the brake drum by screws 16 and the locking ring is retained on the bush 14, both in the locking and release positions, by the lips 11 which overlie its segments 12.

The locking ring segments 12 occupy arcs which may be substantially equal to, though not greater than, those occupied by the projections 6, and in the embodiment illustrated, the inwardly directed lips 11 on the projections 6, extend over a wider arc than the gaps between the lips which accommodate the wheel segments 3. It is thus possible for each locking ring segment to bridge an adjoining pair of lips 11 with a wheel segment therebetween and thereby provide a very rigid securement, while when rotated to the release position the locking ring segments 12 are lapped by such lips so as to leave the gaps unobstructed for the removal of the wheel.

The torque transmitting projections 6 are provided on their outer faces with conical lead surfaces 17 which act on the centralising edges 19 of the wheel between the wheel segments 3 and thereby lead the wheel to the central locating surface 18 when it is being mounted. The surfaces 17 are beaded at 20 to retain the re-entrant resilient flange 21 of a hub cab 22 (Fig. 2).

To detach the wheel the hub cap 22 is first removed and the locking ring 13, which is shown in the locking position in Fig. 1, is rotated anti-clockwise through an appropriate angle to bring its segments 12 entirely under the lips 11 and at the same time uncover the wheel segments 3; the wheel 1 is thus free to be moved axially away from the brake drum, the segments 3 moving outwardly between the torque-transmitting faces 10 of the projections. When a wheel is to be mounted, the reverse procedure is adopted, the centralising edges 19 of the wheel being guided by the conical surfaces 17 to a central position against the face of the brake drum, the wheel segments 3 fitting between the projections 6 and the segments 12 of the locking ring. The locking ring is then rotated clockwise to cover and secure the wheel segments 3, the segments 12 each having an inclined face (not shown) which enables the wheel segment to be wedged tight between the segment 12 bridging two adjacent lips 11 and the drum 4 and thus provide rigid securement of the wheel.

In the example shown, the locking ring is retained in the locked position by a pair of spring pawls 24 mounted on the brake drum 4 by screws 25. The free ends 26 of these pawls spring outwardly when uncovered by the trailing edges of the locking ring segments 12 during movement thereof to the locking position and thus prevent said edges moving back accidentally to release the wheel.

Thus to release the wheel for replacement, both pawl ends 26 must be depressed simultaneously to permit anti-clockwise rotation of the locking ring, and a suitable tool for effecting this, while also overcoming the resistance of the tightly wedged locking ring, is shown in Fig. 4. Such tool comprises a tubular body 30 having at one end a tommy bar or handle 31 and at the other end four dogs 32 adapted to fit between the locking ring segments when in use. To release the wheel, the tool is placed in position and pressed against the wheel assembly so that two of the dogs 32 force back the spring pawls 24 out of engagement with the ring segments 12, when the tool can be rotated in an anticlockwise direction and takes with it the locking ring 13 to release the wheel. For locking, the tool is rotated in the opposite direction sufficiently for the pawls to spring outwardly behind the locking ring segments.

It will be appreciated that in the arrangement shown the locking ring 13 is retained permanently by the lips 11, from which it cannot escape in any position. Therefore on the initial assembly of the device the bush 14 must first be screwed on the brake drum, the locking ring 13 being then rotatably positioned thereon, and finally the ring 7 with the torque transmitting projections 6 is screwed on to the brake drum with the lips 11 embracing the locking ring segments 12.

In place of or in addition to the arrangement just described, the locking ring may, as shown in Fig. 5, be retained by a flange 211 formed on a bush 214 equivalent to the bush 14, such flange preferably having its inner face stepped or intermittently inclined as at 210 to co-operate with the locking segments 12 in clamping the locking ring when the latter is wedged in the locking position. With the latter arrangement the lips 11 may, if desired and as shown, be omitted and be entirely replaced by the said flange.

In the embodiment described, accidental movement of the locking ring beyond the locking position is conveniently prevented by the wedging action of the inclined faces of the locking ring, but such movement may be prevented by any suitable fixed or detent stop.

The present invention provides an improved simple and robust arrangement which enables a wheel to be secured or detached by a rapid operation and which eliminates the necessity for loose securing members. The arrangements also may be such as to permit the use of a simple disc wheel having no moving parts.

What I claim is:

1. Means for securing a detachable vehicle wheel to a rotary mounting, comprising an inclined lead on the mounting to guide the wheel to a central position on securement, lateral projections extending from the rotary mounting and fast therewith and adapted to engage corresponding apertures in the wheel to transmit torque thereto, and locking means carried by the rotary mounting and adapted, by rotary movement in a plane normal to the axis of the rotary mounting, to pass from a release position, in which the locking means does not obstruct removal of the wheel but remains on the mounting after such removal, to a locking position between retaining abutment means provided for the purpose on the rotary mounting and appropriate portions of the wheel, in which latter position said locking means secures the wheel on its mounting.

2. Wheel securing means according to claim 1 wherein the retaining abutment means are inwardly directed lips formed on the torque transmitting projections of the rotary mounting.

3. Wheel securing means according to claim 1 wherein the locking means is constituted by locking segments formed on a rotatable ring and projecting radially outwards therefrom, the inner periphery of the wheel being correspondingly interrupted to pass over the locking ring segments during attachment and detachment.

4. Wheel securing means according to claim 3 wherein the interruptions in the wheel inner periphery constitute the apertures co-operating with the torque transmitting projections on the rotary mounting, the uninterrupted inner peripheral portions of the wheel forming inwardly extending spoke-like wheel segments which fit between such projections and are secured by the locking ring in its locking position.

5. Wheel securing means according to claim 4 wherein the torque transmitting projections are part-circular and have on their outer peripheries conical lead surfaces which co-operate with corresponding circular centralizing edges of the interruptions in the wheel to guide the wheel to an accurately located position against the mounting.

6. Wheel securing means according to claim 5 wherein the segments of the locking ring occupy a wider arc than the gaps between retaining abutment lips, so that in the locking position each locking segment bridges a pair of adjacent retaining abutment lips with a wheel segment therebetween to effect rigid securement of the wheel.

7. Wheel securing means according to claim 6 wherein the trailing edge of at least one of the locking segments, in the locking direction, co-operates with a spring detent which is free to move outwardly when uncovered by said locking segments, on the locking position being reached, and requires to be released before the locking ring can be moved from its locking position.

8. Wheel securing means as claimed in claim 7, and means for actuating the locking ring of the said locking means comprising a shank, an operating handle and dog teeth at one end of the shank adapted to fit between the locking segments for the operation of the ring in either direction and to depress the spring detent inwardly for movement from the locking position.

WALTER ROY WHITEHEAD.

REFERENCES CITED

The following references are of record in the file of this patent:

UNITED STATES PATENTS

| Number | Name | Date |
|---|---|---|
| 1,143,870 | Wade | June 22, 1915 |
| 1,181,801 | Rees | May 2, 1916 |
| 1,253,420 | Putnam | Jan. 15, 1918 |
| 1,353,511 | Baumgartl | Sept. 21, 1920 |
| 1,402,440 | Putnam | Jan. 3, 1922 |
| 1,837,574 | Mulhern et al. | Dec. 22, 1931 |
| 2,026,586 | McVeagh | Jan. 7, 1936 |

FOREIGN PATENTS

| Number | Country | Date |
|---|---|---|
| 24,059 | Great Britain | A. D. 1910 |
| 524,665 | France | Sept. 8, 1921 |